Figure 1:
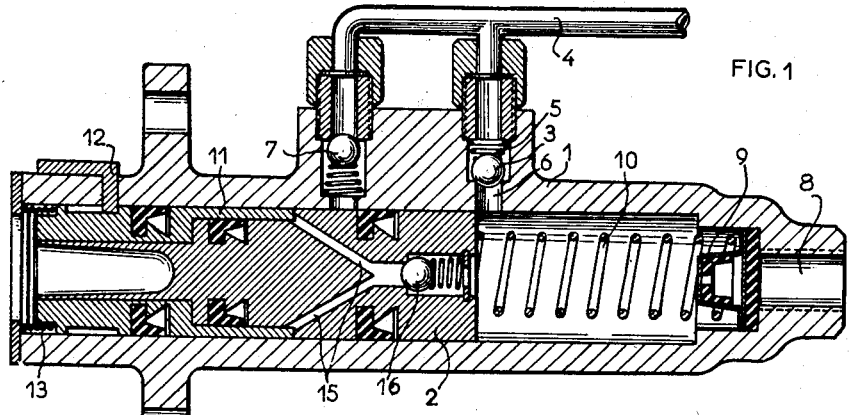

Oct. 20, 1959    A. DUBONNET    2,909,036
DEVICE FOR TAKING UP LINING WEAR IN HYDRAULIC
BRAKES, AND BRAKES INCORPORATING SAID DEVICE
Filed May 17, 1957

United States Patent Office 2,909,036
Patented Oct. 20, 1959

2,909,036

DEVICE FOR TAKING UP LINING WEAR IN HYDRAULIC BRAKES, AND BRAKES INCORPORATING SAID DEVICE

André Dubonnet, Havana, Cuba

Application May 17, 1957, Serial No. 659,963

Claims priority, application France June 28, 1956

4 Claims. (Cl. 60—54.6)

The invention relates to means designed to take up any increase in the stroke of the control pedal in a braking system of the fluid-operated type, this increase being occasioned by the normal wear of the brake linings.

This invention is concerned more particularly with the braking systems of automotive vehicles. Adjustment devices of this general type are already known which are either mounted in the brake mechanism inside each brake drum or interposed between the master cylinder and the wheel cylinders. However, none of these prior devices is completely satisfactory. Firstly, even if they function satisfactorily, the pedal stroke or travel does not increase but the interval in which it takes place is altered; consequently, from the onset it is necessary to have a certain pedal height so that the same travel may be maintained by moving nearer to the pedal board or floor as the brake linings wear out. Secondly, when the brakes are applied in a prolonged manner the brake drums expand under the influence of the heat developed by the friction between them and the lining, so that the clearance between the linings and the drum increases and entails an untimely operation of the wear take-up device, as if an actual wear had taken place. Upon cooling, the drums resume their normal dimensions but the brake shoes remain in their new positions due to the operation of the wear take-up device, which occasions the grab or seizing of the brakes, or at least a substantial decrease in the pedal stroke.

These drawbacks can be avoided by using the device of this invention. It constitutes per se an improved master cylinder substantially of same over-all dimensions as existing master cylinders. Therefore, a single device is sufficient for one vehicle.

In view of the foregoing it is the essential object of this invention to provide a master-cylinder forming device which comprises a valve system adapted on the one hand to increase the hydraulic head between the piston of the master cylinder and the pistons of the wheel cylinders as the clearance between the linings and the brake drum increases, and on the other hand reduces the volume of said hydraulic head when the clearance between the brake linings and the drums decreases, whereby the pedal stroke remains substantially unaltered and has the same initial position irrespective of the brake lining wear; if the hydraulic head increases on account of a brake drum expansion due to a prolonged brake application, said head will resume its initial value when the drum has cooled down.

According to a typical embodiment of the invention, two non-return valves are arranged between the bore of the master cylinder and the fluid reservoir, one of these valves enabling the fluid to flow from the master cylinder to the reservoir when the pressure in the former exceeds a predetermined value, the other valve permitting the circulation of fluid only in the direction from the reservoir to the cylinder; a third valve also of the non-return type is positioned within the piston of the master cylinder to permit the one-way circulation of fluid towards that side of the master cylinder which forms part of the aforesaid hydraulic head, the arrangement being such that a quantity of fluid is injected along the pipe lines as soon as the piston stroke in the master cylinder increases with respect to its initial value as a certain quantity of fluid flows from the cylinder to the reservoir due to action of the piston pressure, if the piston stroke decreases due to the cooling of the brake drum.

According to a modified embodiment of the invention a sleeve member is adapted to slide in the master cylinder, in conjunction with the piston, to a limit position corresponding to the desired pedal stroke limit, so that as the piston moves beyond the position corresponding to said limit position an annular recess will be formed between the thus retained sleeve and the piston, means being provided for feeding fluid from the reservoir to said annular recess so that when the piston is retracted by the return spring of the master cylinder this fluid will be "injected" along the pipe lines of the brake system through the non-return or check valve mounted in the piston and communicating with the aforesaid annular recess.

Figure 2:
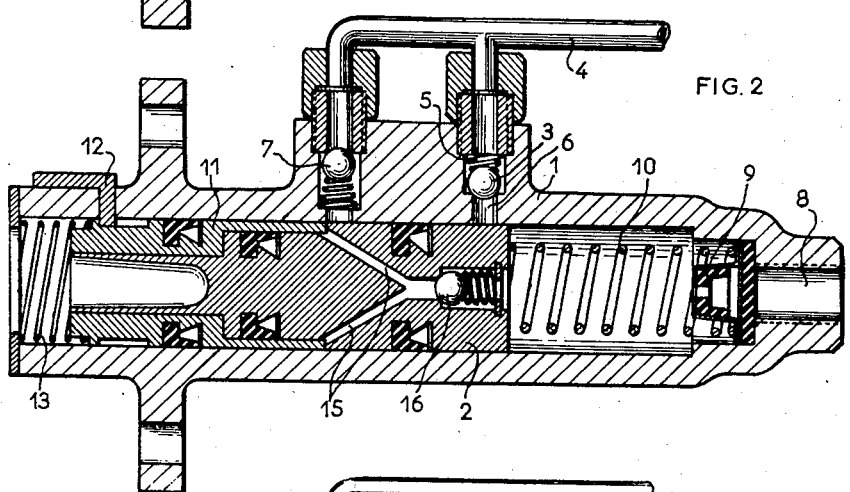
Figure 3:
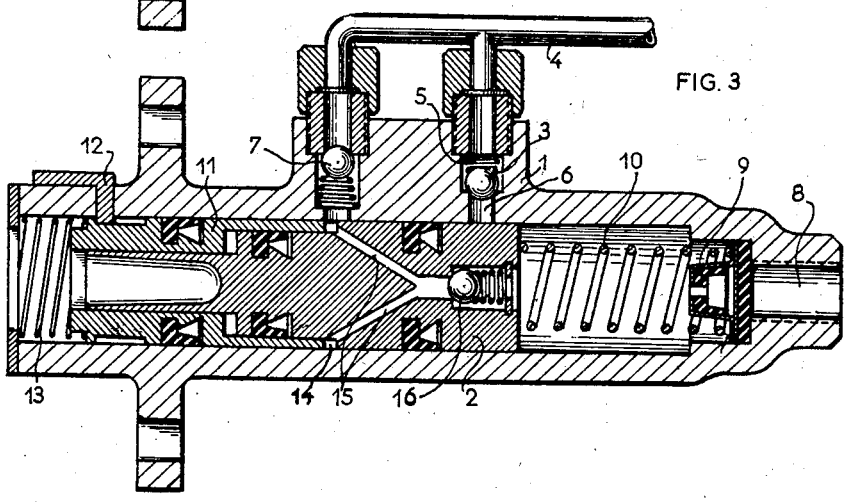

In order to afford a better understanding of the present invention and of the manner in which the same may be carried out in the practice, reference will now be made to the accompanying drawing forming part of this specification and illustrating typical embodiment of the present invention. In the drawing:

Figures 1, 2 and 3 show three longitudinal axial sections of the device of this invention in three different operating positions.

In these figures the reference numeral 1 illustrates the master cylinder of a hydraulic braking system, this cylinder 1 has slidably fitted therein a piston 2 having a rear end (on the left-hand side of the figures) of conventional design adapted to receive the push rod actuated by the pedal (not shown). A non-return or check valve 3 enables the fluid contained in the right-hand part of the cylinder to flow along the pipe line 4 connected to the fluid reservoir (not shown in the figures). This flow cannot take place unless the pressure in cylinder 1 is of a value sufficient to overcome the resistance of a calibrated spring 5 pressing the valve-forming ball 3 against the orifice of passage 6. Another non-return or check valve 7 controls the one-way flow of brake fluid from the reservoir to the cylinder. The cylinder outlet 8 is connected to the hydraulic circuit incorporating the wheel cylinders (not shown in the figures). The reference numeral 9 designates an output limiter or check valve which has no direct bearing with this invention, and 10 is the piston return spring whereby the piston is restored to its initial position (Figure 1) when the brake pedal is released. A sleeve member 11 urged by a coil spring 13 is also slidably mounted in the cylinder 1 in alignment with the piston 2. The stroke of this sleeve member is limited by a stop 12 so that it cannot move beyond a certain limit position shown in Figures 2 and 3. If the piston 2 continues its forward movement (to the right as seen in the drawing) for example to the position shown in Figure 3, an annular recess 14 will be formed between the piston 2 and sleeve 11; this recess 14 communicates through passages 15 formed in the piston 2 with a check valve 16 mounted in the piston. The check valve 16 is so designed that the flow of fluid is possible only in the direction from said annular recess 14 to the hydraulic or brake circuit controlling the wheel cylinders (i.e. from left to right in the figures).

The operation of the device described hereinabove is as follows. When neither appreciable lining wear nor temporary drum expansion take place, and if no pressure is exerted on the brake pedal, the piston 2 and sleeve member 11 will remain in the positions shown in Figure 1. The right-hand portion of the cylinder is filled with fluid. When a pressure is exerted on the brake pedal, it is transmitted to the piston 2 which is thus moved to the right (in the figure) and applies force to the fluid. However, this force cannot exceed a predetermined value as controlled by the calibrated spring 5. The force of this spring is calculated to produce in the right-hand portion of the cylinder 1 a pressure sufficient to cause the brake shoe linings to contact the brake drums. However, the full hydraulic pressure consistent with a proper brake application, when the brake shoes contact the drum, is produced only when the piston 2 has moved beyond the orifice 6 and therefore obturated the latter.

Upon cessation of the pedal pressure the piston resumes its initial position due to the hydraulic pressure created in the circuit and the pressure of the return spring 10. Consequently, the operational sequence is exactly the same as in conventional-type hydraulic braking systems. However, when the shoe linings become worn and the strokes between the shoes and the drum surfaces increase the brake application requires a greater volume of fluid in the hydraulic circuit for producing the brake application. Thus, the movement of piston 2 to the right, which determines this fluid volume, increases and the piston moves to a position beyond that in which it had to be moved for a brake application before the lining wear had occurred. Figure 3 shows the position of the piston corresponding to its maximal stroke in case of brake lining wear (in this figure the excess stroke of the piston has been exaggerated in order to make the mode of operation more apparent). When the piston moves beyond the position illustrated in Figure 2, an annular recess 11 is formed which is filled immediately with fluid flowing across the valve 7. Upon cessation of the brake application and as the piston 2 moves back to its initial position the annular recess 11 is closed again and as the fluid therein cannot flow back to the reservoir through the valve 7 it is injected or forced through the valve 16 along the pipe lines of the brake circuit. Thus, this circuit receives an additional quantity of fluid each time the piston 2, upon completion of each brake application, oversteps its limit position at the right (Figure 2). In other words, fluid is injected in the brake circuit upon each brake application as long as the pedal stroke has not resumed its initial length, i.e. the stroke value obtained before any wear develops in the linings. If the brake drums expanded owing to a prolonged brake application but without producing any appreciable lining wear, the brake applications and fluid injections take place as in the case of wear just considered as long as the drums are not cooled and do not resume their normal dimensons. On the other hand, when the drums are cooled there is an excess of brake-operating fluid in the circuit which reduces the pedal stroke. Under these conditions when the pedal is depressed the piston 2 will reach its end position too early and the brake shoes contact the drums before the piston obturates completely the inlet port of passage 6. Since at this time the pressure in the circuit corresponds to a full brake application and therefore exceeds the calibration of the spring tending to seat or close the valve 3, any excess fluid in the circuit will flow through the calibrated valve 3 and then along the line 4 leading back to the reservoir.

Of course, this invention is by no means restricted to the typical example described and illustrated herein as many modifications and alterations may be brought thereto without departing from the spirit and scope of the invention, as will be readily understood by anybody conversant with the art. Thus, the valve system utilized may differ from the one illustrated, and the various component elements of the device may have different shapes.

It will be noted that with the device of this invention the check valve 9 may be dispensed with, whereby the four wheel cylinders may be bled automatically.

On the other hand, when the braking system is inoperative the spring-urged brake shoes instead of bearing against rigid abutments engage a fluid column. Consequently the initial movement of any brake applications are effected with substantially the same tension in the return springs associated with the four brakes (in the case of a four-wheel vehicle). Thus, if for any cause one brake began to wear at a faster rate than the other three, in the next brake applications the other three brakes will engage the drum surfaces first, this condition prevailing until a perfect balancing of the wears is obtained. Therefore, the device of the present invention may be considered as a compensating master cylinder.

What I claim is:

1. A device for compensating for lining wear in hydraulic brakes without varying the brake pedal stroke, for use in a brake system including a hydraulic braking circuit, a fluid reservoir connected to said circuit, a wheel cylinder for each wheel, and a brake pedal operable to supply fluid from said reservoir to said wheel cylinders, said device comprising a master cylinder, an inlet from said reservoir to said master cylinder, a check valve in said inlet, an outlet from said master cylinder to said wheel cylinders, a return line from said master cylinder to said reservoir, a check valve in said return line, a piston in said master cylinder movable by said brake pedal to force hydraulic fluid through said outlet to said brake cylinders, a spring in said master cylinder biasing said piston to return position, said piston having a reduced end portion forming a shoulder, a sleeve in said cylinder surrounding said reduced end portion and movable with said piston throughout the normal path of travel of said piston, stop means for said sleeve whereby upon continued movement of said piston in excess of its normal path of travel, an annular recess is formed between said shoulder and the end of said sleeve, said stop means being so located as to position said recess adjacent said inlet for the reception of auxiliary fluid from said inlet in said recess, and means including a passage through said piston for supplying auxiliary fluid from said recess to said wheel cylinders when said piston is moved beyond a predetermined limit position, the amount of auxiliary fluid thus provided corresponding to the increase of the piston stroke, and a non-return check valve in said passage through said piston.

2. The device of claim 1 wherein a spring is provided biasing said sleeve toward said shoulder.

3. The device of claim 1 wherein said return line is so positioned as to be open when the piston is fully retracted and closed by forward movement of the piston.

4. The structure of claim 3 wherein said check valves comprise spring-loaded ball valves.

References Cited in the file of this patent

FOREIGN PATENTS 895,417     France  ---------------- Apr. 3, 1944